United States Patent [19]

Tillson et al.

[11] 4,317,160
[45] Feb. 23, 1982

[54] ELECTRICAL SWITCHBOARD HAVING IMPROVED DRAWOUT APPARATUS

[75] Inventors: Robert S. Tillson, Terryville; William F. Olashaw, Plainville; James H. Postlethwait, Simsbury, all of Conn.

[73] Assignee: General Electric Company, New York, N.Y.

[21] Appl. No.: 173,949

[22] Filed: Jul. 31, 1980

[51] Int. Cl.³ .............................................. H02B 1/04
[52] U.S. Cl. ................................ 361/339; 339/92 M; 200/50 AA; 361/343
[58] Field of Search ........... 200/153 R, 50 R, 50 AA, 200/51 R, 318–324; 339/92 R, 92 M; 361/331, 332, 335–339, 343, 391

[56] References Cited

U.S. PATENT DOCUMENTS

| | | | |
|---|---|---|---|
| 2,826,722 | 3/1958 | Zautner | 361/338 |
| 2,885,502 | 5/1959 | Eichelberger | 361/336 |
| 3,142,003 | 7/1964 | Olashaw | 361/338 |
| 4,179,179 | 12/1979 | Lowden | 339/92 M |
| 4,202,027 | 5/1980 | Ericson | 361/338 |

Primary Examiner—Gerald P. Tolin
Attorney, Agent, or Firm—Richard A. Menelly; Walter C. Bernkopf; Philip L. Schlamp

[57] ABSTRACT

An electrical device is supported on rails for racking movement between disengaged and engaged positions through an intermediate test position. The device mounts a single lead screw centrally located between the rearwardly extending device line and load terminal disconnects for threaded engagement with a caged nut fixedly mounted at a central location between the switchboard line and load terminal disconnects. A chain and sprocket drive train mounted by the device communicates rotational drive to the lead screw from a manual drive input applied at the front of the device to motivate racking movement between the disengaged and engaged positions. Interlocks are included to insure the device is off while the device and switchboard disconnects are being mated and unmated incident with this racking movement.

10 Claims, 12 Drawing Figures

ELECTRICAL SWITCHBOARD HAVING IMPROVED DRAWOUT APPARATUS

BACKGROUND OF THE INVENTION

The present invention relates generally to electrical switchboards and particularly to improved drawout apparatus for incorporation therein.

Prior art manually operated drawout apparatus have typically utilized various forms of camming mechanisms to achieve sufficient mechanical advantage requisite to overcoming the considerable contact pressures involved in mating and unmating the primary disconnects as the drawout device is manually racked between its engaged and disengaged positions. To minimize skewing of the device during this racking movement, the camming mechanism normally utilizes pairs of co-acting camming elements, stationed on opposite sides of the device, operating to develop parallel forces motivating the device between its engaged and disengaged positions. This approach is somewhat complex and costly, particularly since rather stringent manufacturing tolerances are required to insure that the racking forces are developed uniformly so that the device is racked smoothly between its engaged and disengaged positions in non-binding, unskewed fashion. Another consideration applicable to prior art drawout camming mechanisms is that there is typically a degree of play inherent in the co-acting camming elements when the direction of racking movement is reversed. Thus, when the device is racked to its fully engaged position, it is not fixedly secured thereat by the camming elements. Consequently, the electromotive forces associated with high fault currents flowing through the primary disconnects and, if the device is a circuit breaker, the gaseous high pressure exhaust emanating therefrom during a high fault current interruption develop considerable blowout forces acting to drive the device away from its fully engaged position. These blowout forces are not immediately resisted by the camming elements. To remedy this situation, a special latch has been utilized to securely hold the device in its fully engaged position, as disclosed and claimed in commonly assigned U.S. Pat. No. 4,202,027.

It is accordingly an object of the present invention to provide an improved switchboard drawout apparatus.

A further object is to provide drawout apparatus of the above character which is uniquely structured to achieve uniform and smooth racking movement of an electrical device as its primary disconnects are mated and unmated with associated switchboard primary disconnects.

An additional object is to provide a drawout mechanism of the above character which is inherently structured to securely retain the device in its fully engaged position.

Another object is to provide drawout apparatus of the above character which incorporates improved interlocking provisions to insure that the electrical device is in its off or open circuit condition while the primary disconnects are being mated and unmated.

Yet another object is provide drawout apparatus of the above character which is efficient in construction, inexpensive to manufacture, reliable in operation and both convenient and safe to use.

Other objects of the invention will in part be obvious and in part appear hereinafter.

SUMMARY OF THE INVENTION

In accordance with the present invention, there is provided drawout apparatus for an electrical switchboard for racking an electrical device, such as a circuit breaker, between engaged and disengaged positions through an intermediate test position. Incident with this racking movement, the circuit breaker primary disconnects, i.e., line and load terminal stabs, are mated and unmated with associated switchboard primary disconnects, i.e., line and load terminal stabs. The subject drawout apparatus includes an improved manually operated racking mechanism uniquely and efficiently structured to achieve uniformly distributed mating and unmating forces at the individual disconnects such as to provide smooth, unskewed racking movement of the circuit breaker between its engaged and disengaged positions.

To this end, the circuit breaker rides on telescoping side rails mounted to the switchboard for facile movement into and out of a switchboard cubicle or compartment. Fixedly mounted to the switchboard at the rear of the cubicle in a position rather precisely centrally located between the switchboard line and load disconnects is a single caged nut. A single lead screw is then rotatably mounted to the rear of the circuit breaker in a position centrally located between the device line and load disconnects. A right angle drive train, also mounted to the circuit breaker, communicates manual drive input applied at a convenient point adjacent the front of the circuit breaker into driven rotation of the lead screw. Thus, when the lead screw and nut are threadedly engaged, rotation of the former creates a single force acting along the lead screw axis for smoothly propelling the circuit breaker into and out of its engaged position, in the process uniformly mating and unmating the plural primary disconnects. It will be appreciated that the mounted positions of the lead screw and drive train on the one hand, and the cage nut on the other hand may be reversed and still achieve the objects of the present invention.

As an additional feature of the present invention, an interlock is provided to preclude the application of manual input to the drive train while the breaker contacts are closed to thus preclude current flow through the primary disconnects while they are being mated and unmated. As an extra precaution, an additional interlock is provided to automatically insure that the circuit breaker latch is defeated to render breaker closure impossible while it is being racked between its test and engaged positions. The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several views of the drawings.

DETAILED DESCRIPTION

Figure 1:
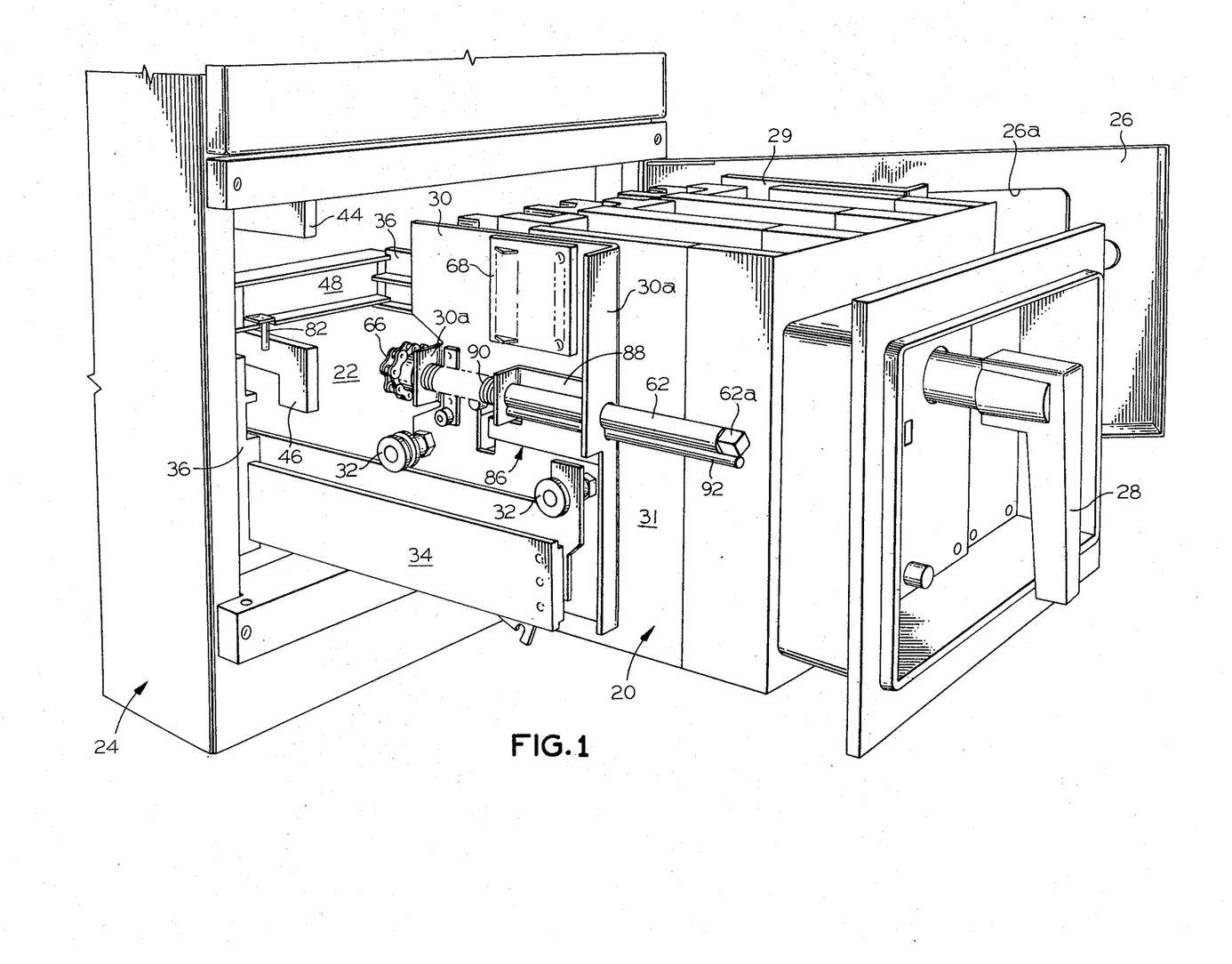
FIG. 1 is a perspective view of circuit breaker drawout apparatus constructed in accordance with the present invention and illustrating the circuit breaker in its fully extended position.

Referring to FIG. 1, the drawout apparatus of the present invention, mounts a molded case industrial circuit breaker, generally indicated at 20, for movement into and out of a cubicle or compartment 22 of an electrical switchboard, generally indicated at 24. When the circuit breaker is moved into the cubicle, a side hinged door 26 is closed to seal off the front opening thereof. The door is suitably apertured, as indicated at 26a, so as to expose the circuit breaker operating handle 28 and various escutcheon mounted pushbuttons which are manipulated to selectively condition the circuit breaker.

Figure 2:
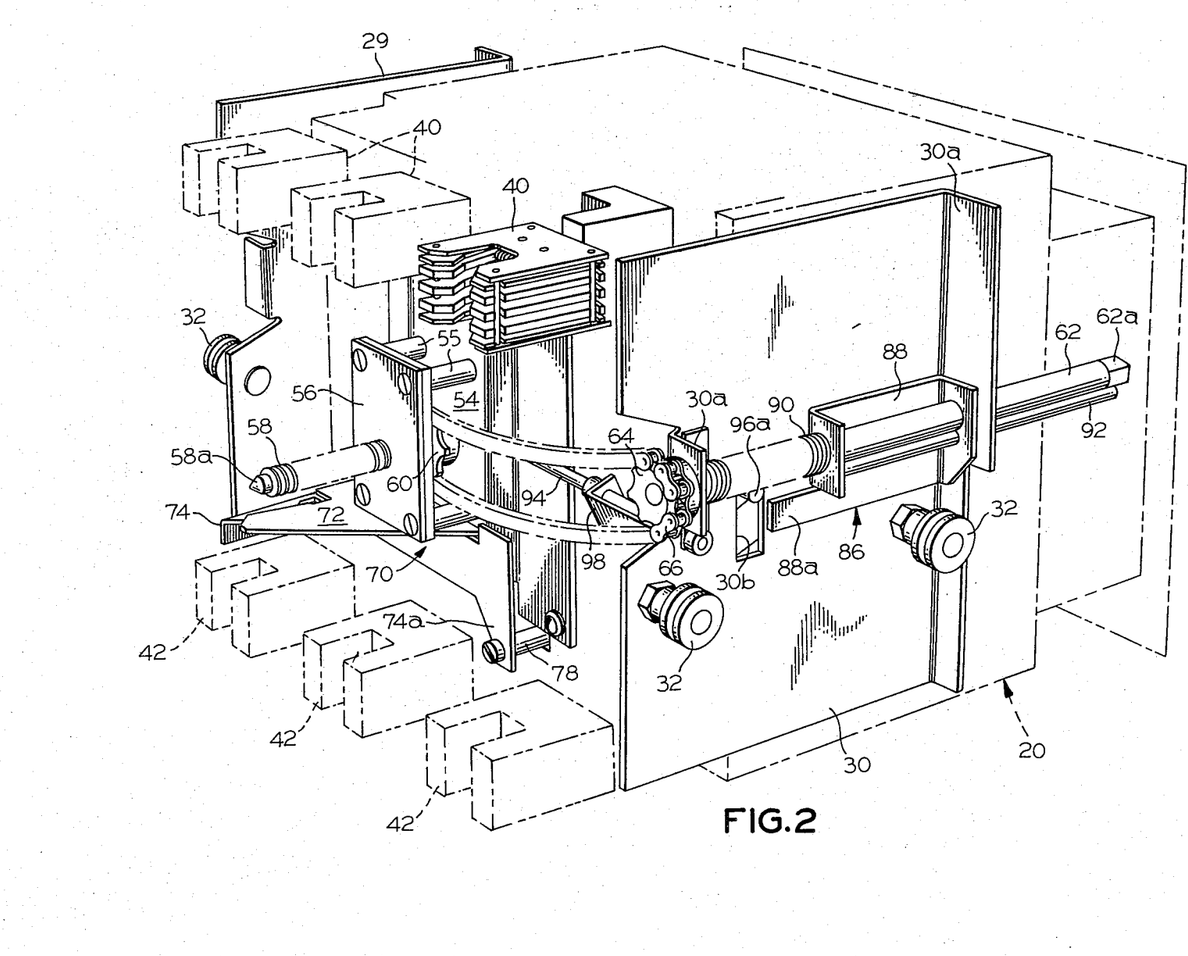
FIG. 2 is a perspective view of the movable portion of the drawout apparatus of FIG. 1.
Figure 3:
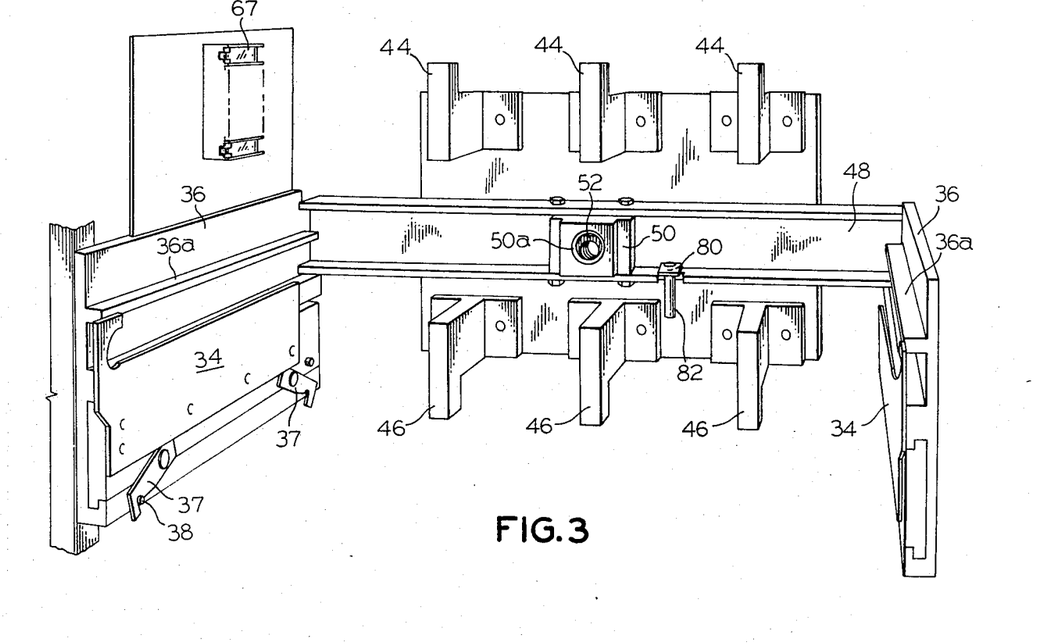
FIG. 3 is a perspective view of the stationary portion of the drawout apparatus of FIG. 1.

As seen in FIGS. 1 and 2, carriage sideplates 29 and 30 are secured to opposed sides of the breaker molded case 31. Each sideplate mounts a pair of longitudinally spaced rollers 32 which are grooved to provide reduced diameter surfaces riding on the upper edges of opposed outer rails 34 to support the circuit breaker in its extended position seen in FIG. 1. As seen in FIG. 3, these outer rails 34 are telescopically mounted to stationary inner rails 36 affixed to the switchboard frame along each side of switchboard cubicle 22. When the circuit breaker is rolled into the cubicle, the larger diameter outer rims of carriage rollers 32 ride onto tracks 36a of the inner rails to support the circuit breaker for racking movement between so-called "disengaged", "test" and "engaged" positions. A pair of hooks 37 pivotally mounted to each outer rail 34 engage a pin 38 mounted by each inner rail 36 to limit the extent of telescopic movement of the outer rails.

As best seen in FIG. 2, circuit breaker 20 is equipped with three line terminal primary disconnects 40, in the form of female stab connectors, disposed in a transverse array across the upper rear of the breaker case 31, and three load terminal primary disconnects 42, again in the form of female stab connectors, disposed in a transverse array across the lower rear of the breaker case. As seen in FIG. 3, the switchboard is equipped with a complementing set of line terminal primary disconnects 44, in the form of male stab connectors in one transverse array across the back of the cubicle, and a complementary set of load terminal primary disconnects 46, again in the form of male stab connectors, in a separate transverse array across the back of the cubicle.

Still referring to FIG. 3, spanning the rear of the switchboard cubicle midway between the vertically spaced transverse arrays of switchboard line and load terminal disconnects is a stationary stringer 48 which serves to fixedly mount in vertically aligned relation with the center pole switchboard line and load terminal disconnects a cage 50. A nut 52, operative in the racking mechanism of the present invention, is floatingly captured within this cage in a suitable manner such as to prevent significant rotational or longitudinal movement thereof, but accommodates limited lateral movement thereof for reasons which will become apparent.

Returning to FIG. 2, a mounting pan 54 is affixed to the base or rear wall of circuit breaker 20 in the region between the vertically spaced transverse arrays of line terminal primary disconnects 40 load terminal primary disconnects 42. Standoff posts 55 serve to mount a journal plate 56 in rearwardly spaced relation to mounting pan 54. The pan and plate provide axially spaced journalling points for a lead screw 58 positioned in vertical alignment with and midway between the circuit breaker center pole line and load terminal primary disconnects. Affixed to the lead screw shaft at a location between mounting pan 54 and journal plate 56 is a sprocket 60 included in a right angle drive train of the racking mechanism. Also included in this drive chain is an elongated shaft 62 which is rotatably mounted by laterally turned flanges 30a of carriage sideplate 30. Affixed to the rearward end of this shaft is another sprocket 64 which is drivingly coupled with sprocket 60 by a chain 66. The forward termination of shaft 62 is squared off, as indicated in 62a, to accommodate rotational drive coupling relation with a socket wrench seen at 65 in FIGS. 4 and 5.

It is thus seen that rotation of shaft 62 by socket wrench 65 imparts driven rotation to lead screw 58 via sprockets 62, 64 and chain 66. It will be appreciated that the requisite right angle drive train to impart rotation to lead screw 58 from a convenient manual input point adjacent the front of circuit breaker 20 may be constructed to utilize other forms of driving elements, such as, for example, bevel gearing.

Figure 4:
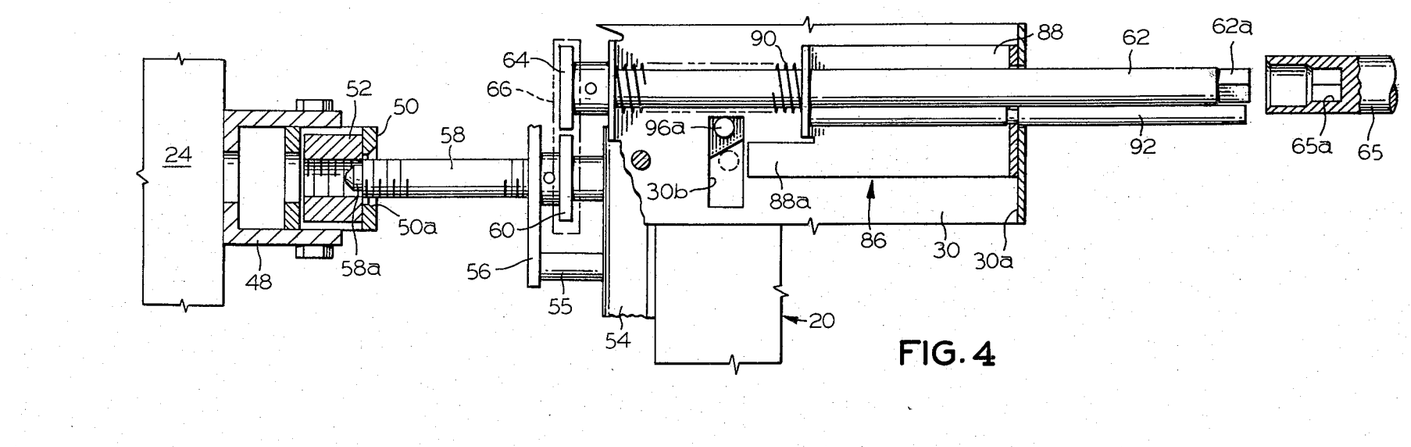
FIG. 4 is a fragmentary side elevational view of the racking mechanism utilized in the drawout apparatus of FIG. 1.
Figure 5:
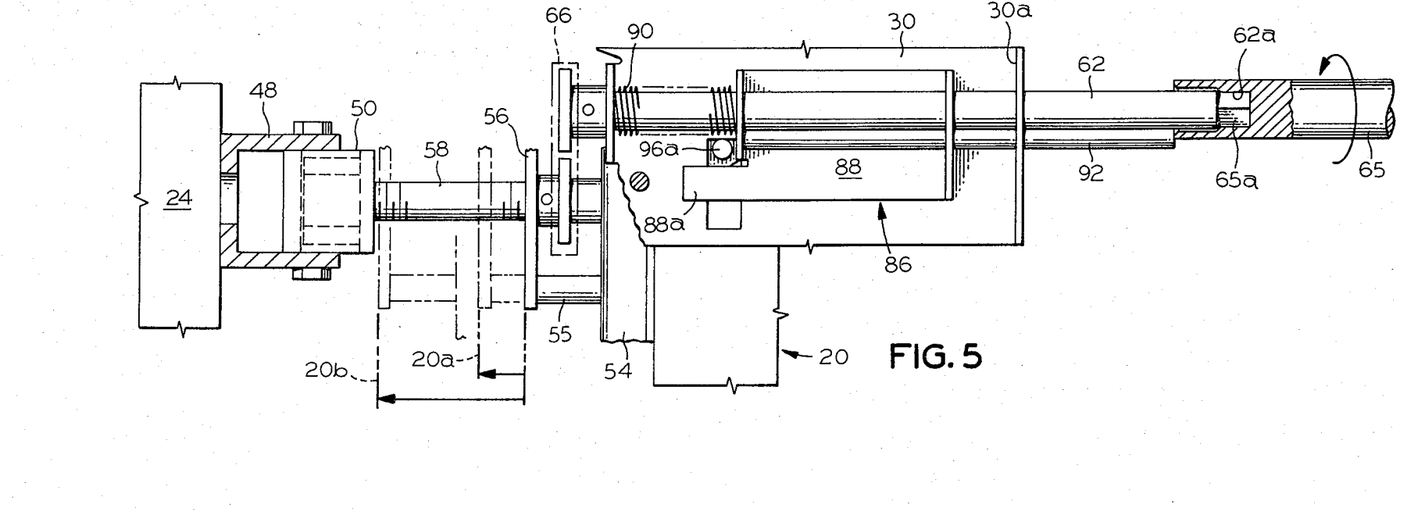
FIG. 5 is a side elevational view of the racking mechanism of FIG. 4 illustrating manual operation thereof.
Figure 6:
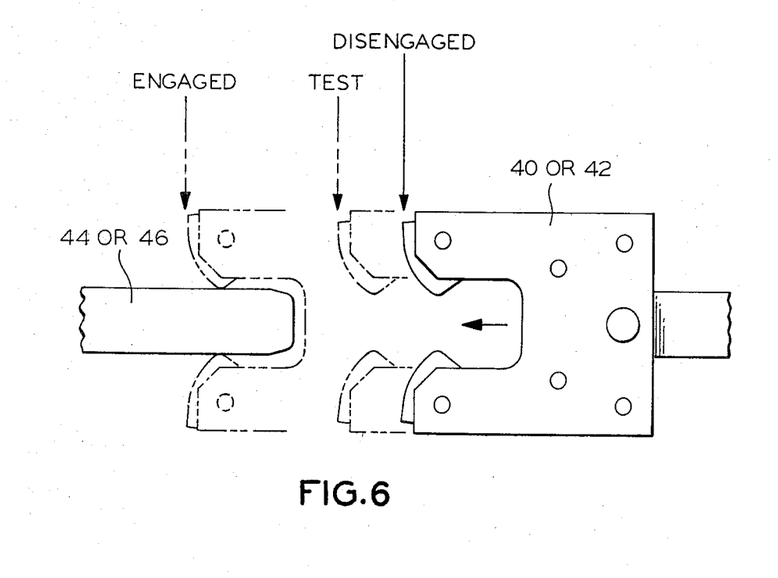
FIG. 6 is a fragmentary side elevational view of the relationship of the circuit breaker and switchboard primary disconnects when the latter is in its disengaged, test and engaged positions.

When circuit breaker 20 is rolled from its extended position of FIG. 1, supported on the telescopically extended outer rails 34, into cubicle 22, where it is then supported on tracks 36a of inner rails 36, the circuit breaker comes to its disengaged position. As seen in FIG. 4, the conical lead-in tip 58a of lead screw 58 has penetrated the central opening 50a in cage 50 and engageably positioned nut 52 into axial alignment with the lead screw. It is seen that by somewhat loosely capturing the nut within cage 50, slight misalignments between the lead screw and nut are accommodated. While the circuit breaker is in its disengaged position, the breaker and switchboard line and load terminal primary disconnects are in displaced relation, as illustrated in FIG. 6. With rotation of shaft 62 by socket wrench 65 in, for example, the clockwise direction, the threads of lead screw 58 pick up the threads of nut 52. Since both of these threaded elements are fixed against longitudinal or axial movement, a single line of force, aligned with the lead screw axis and rather precisely centrally located relative to the transverse arrays of switchboard and circuit breaker lne and load terminal primary disconnects, is developed to draw the circuit breaker from its disengaged position to its test position fragmentarily indicated in phantom line at 20a in FIG. 5. As illustrated in FIG. 6, while the circuit breaker is in its test position, the switchboard and circuit breaker line and load terminal primary disconnects are still in displaced relation. However, switchboard secondary contacts 67, seen in FIG. 3 to be mounted to one of the cubicle sidewalls, and circuit breaker secondary contacts 68, seen in FIG. 1 to be mounted to carriage sideplate 30, are in interengaging relation. Under these circumstances, the various circuit breaker accessory functions wired through these secondary contacts may be operationally tested while the circuit breaker and switchboard primary disconnects are unmated.

With continued clockwise rotation of lead screw 58, the circuit breaker is racked inwardly from its test position to its engaged position, bringing the circuit breaker line and load terminal primary disconnects into mating engagement with their respective switchboard primary disconnects. The mechanical advantage afforded by the racking mechanism enables the operator to readily overcome the rather forceful contact pressures built into the circuit breaker primary disconnects as they begin mating with the switchboard primary disconnects. Since only a single line of racking force is generated at a central location intermediate the transverse arrays of line and load terminal primary disconnects, the matings thereof are effected smoothly and uniformly as the circuit breaker assumes its fully engaged position, illustrated at 20b in FIG. 5 and in FIG. 6, in unskewed, non-binding fashion.

To rack the circuit breaker out of its engaged position, shaft 62 is rotated by wrench 65 in the opposite direction to generate a single, centrally located line of force in the opposite direction propelling the circuit breaker back out to its test position, and if desired its disengaged position, again in smooth, unskewed fashion. If it is desired to bring the circuit breaker out to its extended position of FIG. 1 for complete removal or merely to inspect its primary disconnects, the outer rails 34 are simply pulled out to their telescopically extended positions of FIG. 1, and the circuit breaker is simply rolled out onto these rails.

It will be appreciated that while the breaker is in its engaged position, there is no play or looseness in the threaded inter-engagement between the lead screw and nut. Consequently, the breaker is positively held in its engaged position against any blowout forces associated with the flow of high level fault currents through the primary disconnects.

Figure 7:
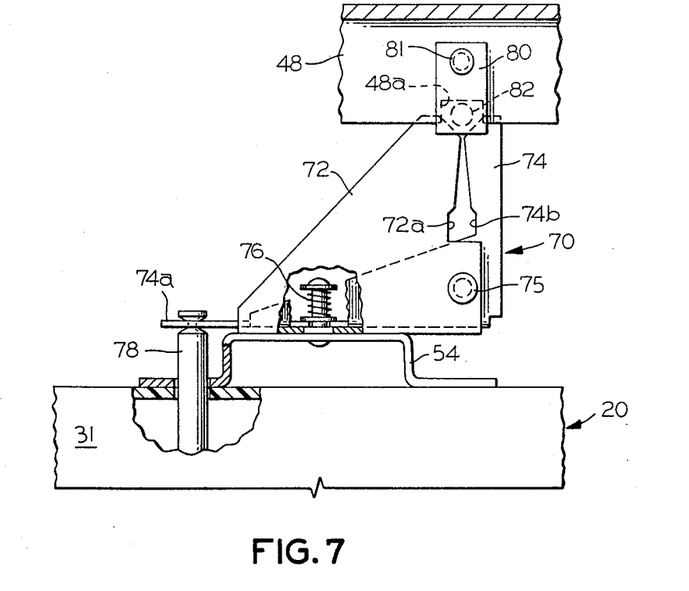
FIG. 7 is a fragmentary plan view of a circuit breaker latch defeat interlock utilized in the drawout apparatus of FIG. 1.

It is very important that the circuit breaker be open while it is racked into and out of its engaged position so as to preclude the flow of current through the primary disconnects as they are being mated and unmated. To this end, the drawout apparatus of the present invention includes an interlock, generally indicated at 70 in FIGS. 2 and 7 through 9, which automatically functions to insure that the circuit breaker is not only open but incapable of closure while it is being racked between its test and engaged positions. As best seen in FIG. 7, this interlock includes a first finger 72 fixedly mounted to pan 54 secured to the back of the circuit breaker. A second finger 74 is pivotally mounted to the first finger by a pin 75. A compression spring 76 biases finger 74 to its position seen in FIG. 7 in essentially closed relationship with finger 72. Finger 74 includes a transverse extension 74a which is fashioned for engagement with the exterior end of a plunger 78 which protrudes through an opening in the base or rear wall of the breaker case 31. The inner end of this plunger is disposed in operative relation with the trip latch (not shown) of the circuit breaker.

As seen in FIGS. 3 and 7, a small arm 80 is pivotally mounted adjacent its rearward end by a pin 81 to the stringer 48 spanning the back of switchboard cubicle 22. The forward end of this arm mounts a depending pin 82 which extends through an edge notch 48a in the stringer serving to limit the extent of pivotal movement of the arm. As seen in FIG. 7, pin 82 is generally disposed in longitudinal alignment with the fingers 72 and 74 of interlock 70. The rearward extension of these fingers exceeds that of the circuit breaker line and load terminal primary disconnects such that these fingers assume positions in confronting relation with pin 82 when the circuit breaker arrives at its test position from its disengaged position, the situation illustrated in FIG. 7. Under these circumstances, spring 76 biases finger 74 to its closed position and plunger 78 is controllably positioned in non-defeating operative relation with the circuit breaker trip latch. The circuit breaker operating mechanism can thus be charged and the breaker contacts closed while in the test position.

Figure 8:
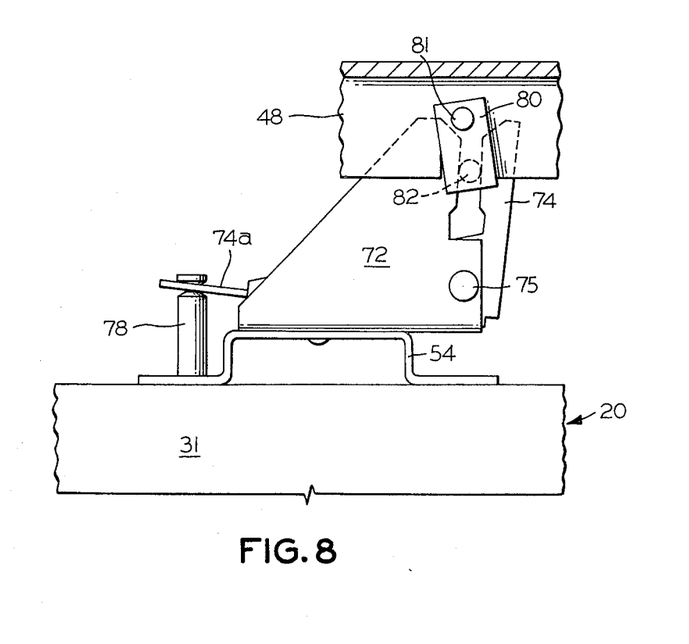
FIG. 8 is a plan view of the interlock of FIG. 7 seen in its latch defeating condition assumed while the circuit breaker is en route between its test and engaged positions.

When the circuit breaker is racked by the racking mechanism from its test position inwardly toward its engaged position, pin 82 encounters the angular leadin edges of fingers 72, 74 and cams finger 74 in the clockwise direction to its position seen in FIG. 8 in separated relation with finger 72. Finger 74 is actuated to this position by pin 82 before the switchboard/circuit breaker primary disconnects touch and is maintained thereat by the pin until the circuit breaker achieves its engaged position. It is seen that while finger 74 is maintained in its actuated position, pin 78 is pulled outwardly to a circuit breaker trip latch defeating position. Under these circumstances, the circuit breaker trip latch can not sustain an operating mechanism charge. If the circuit breaker was closed upon leaving its test position en route to its engaged position, interlock 70 operates to automatically trip the circuit breaker open. Since the defeated condition of the trip latch is maintained while the circuit breaker is en route to its engaged position, the breaker contacts can not be closed during this time.

Figure 9:
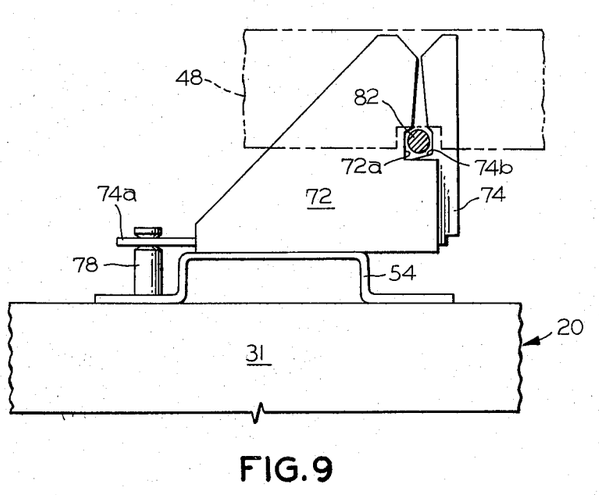
FIG. 9 is a plan view of the interlock of FIG. 7 seen in its latch undefeating condition assumed while the circuit breaker is in its engaged position.
Figure 10:
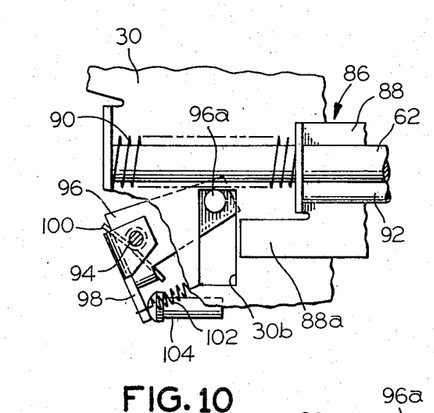
FIG. 10 is a fragmentary side elevational view of a second interlock effective in preventing manual operation of the racking mechanism of FIGS. 4 and 5 while the circuit breaker contacts are closed.
Figure 11:
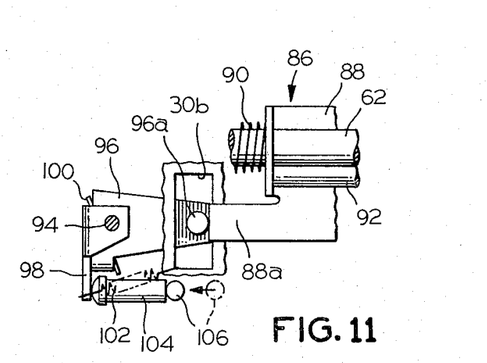
FIG. 11 is a side elevational view of the interlock of FIG. 10, seen in manual operation preventing condition.

As seen in FIG. 9, stationary finger 72 is provided with a notch 72a adjacent its base end, and finger 74 is provided with a complementing notch 74b. Upon arrival of the circuit breaker in its engaged position, pin 82 is abreast of these notches, thereby enabling spring 76 (FIG. 7) to bias finger 74 in the counterclockwise direction back to its unactuated position in closed relation with finger 72. Plunger 78 is thus shifted inwardly to its trip latch non-defeating position. Consequently, the circuit breaker latch is then rendered capable of sustaining a charge imparted to the circuit breaker operating mechanism, and the breaker contacts may then be closed.

Obviously, when the circuit breaker is racked back out of its engaged position, pin 82 is effective to immediately cam finger 74 to its actuated position of FIG. 8. The breaker trip latch is thus automatically defeated, and the circuit breaker, if closed, is tripped open well before the primary disconnects break. Furthermore, it is seen that the circuit breaker is rendered incapable of reclosure until it arrives at its test position.

As a further precautionary measure to insure safe operation of the drawout apparatus of the present invention, an additional interlock, generally indicated at 86 in FIGS. 1, 2 and 10 through 12, is provided to automatically deny access of wrench 65 (FIGS. 4 and 5) to the racking mechanism while circuit breaker 20 is closed. Under these circumstances, the racking mechanism can be manually operated to propel the breaker between its engaged and disengaged positions only while the circuit breaker is open. To this end, interlock 86 includes a bracket 88 which is slideably mounted on shaft 62 of the racking mechanism, as seen in FIGS. 1 and 2. A compression spring 90, also carried by shaft 62, biases bracket 88 forwardly into engagement with the forward flange 30a of carriage sideplate 30. Bracket 88 mounts an elongated rod 92 which extends forwardly in closely spaced parallel relation with shaft 62 to a termination just short of the forward termination 62a. From FIGS. 4 and 5, it is seen that socket 65a of wrench 65 is deeply recessed such that, in order to seat the squared-off termination 62a of shaft 62 therein, rod 92 must be pushed rearwardly against the bias of compression spring 90, as seen in FIG. 5.

Referring currently to FIGS. 2 and 10 through 12, a transverse shaft 94 mounted to the rear of the circuit breaker between mounting pan 54 and sideplate 30 serves to pivotally mount an arm 96 and a paddle 98. A torsion spring 100, carried on shaft 94 and acting on arm 96 and paddle 98, serves to normally maintain an essentially right angular relationship between these parts seen in FIG. 10. A tension spring 102 biases arm 96 and paddle 98 as a unit in the counterclockwise direction to a quiescent position determined by the engagement of a transverse pin 96a, carried at the free end of arm 96, against the upper edge of a rectangular cutout 30b formed in carriage sideplate 30.

Acting on the free lower end of paddle 98 is a plunger 104 which protrudes through an opening in the base or rear wall of the breaker case 31 into actuating relation with a pin 106 carried by one of the movable contact arms (not shown) of the circuit breaker. When the breaker contacts are open, pin 106 is in its phantom line position seen in FIG. 11. However, when the breaker contacts are closed, this pin assumes its solid-line position of FIG. 11, pushing plunger 104 outwardly into actuating engagement with paddle 98. This paddle and arm 96 are thus swung as a unit in the clockwise direction, and pin 96a is moved downwardly in cutout 30b to an actuated position seen in FIG. 11 where it is in obstructing relation with a rearwardly extending prong 88a carried by bracket 88. As best seen in FIG. 4, if the circuit breaker is open, pin 96a assumes its solid-line quiescent position under the bias of tension spring 102 (FIG. 10) where it is in elevated, non-obstructed relation with prong 88a. Consequently, bracket 88 is free to be shifted rearwardly as the socket wrench is applied to the termination 62a of the shaft 62 pursuant to manually operating the racking mechanism. However, if the breaker contacts are closed, pin 96a is shifted to its phantom line position of FIG. 4 (see also FIG. 11) where it obstructs rearward movement of bracket 88, and thus access of the socket wrench 65 to the termination 62a of shaft 62 is effectively denied. It is thus seen that manual operation of the racking mechanism is precluded while the circuit breaker is closed, and thus racking movement of the breaker between its engaged and test positions is effectively prevented unless the breaker contacts are open.

Figure 12:
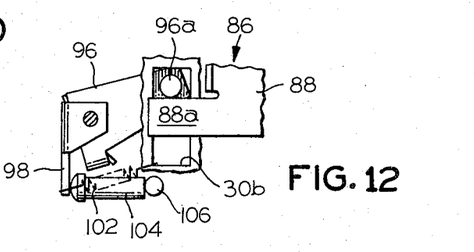
FIG. 12 is a side elevational view of the interlock of FIG. 10 illustrating its condition assumed in response to the inadvertent closure of the breaker while the racking mechanism of FIGS. 4 and 5 is being manually operated.

FIG. 12 is illustrative of an unlikely, but nevertheless possible situation which could be damaging to interlock 86 if arm 96 and paddle 98 were formed as an integral member. If socket wrench 65 is held on shaft termination 62a and the circuit breaker is then closed, prong 88a obstructs the consequent downward movement of pin 96a induced by forceful engagement of plunger 102 with paddle 98. It is seen from FIG. 12 that this situation is tolerated without damaging consequences, torsion spring 100 simply yields to accommodate pivotal movement of the paddle relative to arm 96. It will be noted that, under these circumstances, interlock 86 is defeated in that the racking mechanism can be manually operated to rack the breaker while it is closed. However, no hazards are posed since interlock 70 remains operative to insure that the breaker contacts are open when the circuit breaker is racked between its test and engaged positions.

The invention accordingly comprises the features of construction and arrangement of parts which will be exemplified in the construction hereinafter set forth, and the scope of the invention will be indicated in the claims.

We claim:

1. An electrical switchboard comprising, in combination:

A. an electrical device having a transverse array of rearwardly extending line terminal disconnects and a transverse array of rearwardly extending load terminal disconnects in vertically spaced relation to said line terminal array;

B. a transverse array of switchboard line terminal disconnects and a transverse array of switchboard load terminal disconnects disposed at the rear of a switchboard cubicle, said switchboard disconnect arrays being in vertically spaced relation;

C. rails mounted to opposed sides of the switchboard cubicle;

D. means mounting said electrical device on said rails for racking movement between an engaged position, wherein said device and switchboard line and load terminal disconnects are respectively electrically mated, and a disengaged position, wherein said device and switchboard line and load terminal disconnects are respectively electrically unmated; and E. a racking mechanism including (1) a single nut fixedly mounted to one of said device and switchboard.

(2) a single lead screw rotatably mounted to the other of said device and switchboard, the respective mounted positions of said nut and lead screw being centrally located between said transverse arrays of switchboard and device line and load terminal disconnects such that, with threaded interengagement, rotation of said lead screw creates a single line of force effective in propelling racking movement of said device between said engaged and disengaged positions and incidentally achieving essentially uniformly distributed mating and unmating forces at the individual switchboard and device line and load terminal disconnects, and (3) a right angle drive train mounted by the other of said device and switchboard for communicating rotational drive to said lead screw from a manual drive input applied at a frontal switchboard cubicle location.

2. The electrical switchboard defined in claim 1, wherein said drive train includes chain and sprocket drive coupling elements.

3. The electrical switchboard defined in claim 1, wherein said nut is mounted to said switchboard, while said lead screw and drive train are mounted to said device.

4. The electrical switchboard defined in claim 3, wherein said drive train includes a first sprocket affixed to said lead screw, an elongated shaft rotatably mounted to one side of said device for longitudinal extension from the front to the rear of said device, the forward termination of said shaft fashioned to accept a wrench facilitating manual rotation thereof, a second sprocket affixed on the rearward termination of said shaft, and a chain coupling rotational drive of said second sprocket to said first sprocket.

5. The electrical switchboard defined in claim 1, wherein said electrical device is a circuit breaker, said switchboard further comprising a trip interlock including a first element mounted by said switchboard, and a second element mounted by said circuit breaker for movement between a quiescent and an actuated positions, said second element being operatively coupled with said circuit breaker such as to enable closure thereof while in its quiescent position and to both precipitate tripping of said breaker open and to preclude breaker reclosure while in its actuated position, said first element engageably shifting said second element from its quiescent to its actuated position while said circuit breaker is intermediate said engaged and disengaged positions.

6. The electrical switchboard defined in claim 5, wherein said first element of said trip interlock is in the form of a pin swivel mounted to said switchboard, said trip interlock further including a third element in the form of an elongated, rearwardly extending first finger fixedly mounted to said circuit breaker, said second element being in the form of an elongated, rearwardly extending second finger pivotally mounted to said first finger for movement between said quiescent and actuated positions, said first finger serving as an elongated guide directing said pin into engagement with said second finger pursuant to shifting said second finger from its quiescent to its actuated position.

7. The electrical switchboard defined in claim 6, wherein at least one of said first and second fingers is provided with a notch into which said pin is received when said circuit breaker arrives at its engaged position, whereby to release said second finger for return to its quiescent position under the bias of a spring.

8. The electrical switchboard defined in claim 5, which further comprises a racking interlock operatively coupled with said circuit breaker for denying manual operating access to said racking mechanism while said circuit breaker is closed.

9. The electrical switchboard defined in claim 4, which further comprises a racking interlock including an elongated first member mounted for movement between a first position obstructing acceptance of a wrench on the forward termination of said shaft and a second position, a spring biasing said first member to its first position and a second member responsive to the position of the circuit breaker movable contacts for obstructing the movement of said first member to its second position while the circuit breaker is closed.

10. The electrical switchboard defined in claim 9, wherein said electrical device is a circuit breaker, said switchboard further comprising a trip interlock including a first element mounted by said switchboard and a second element mounted by said circuit breaker for movement between a quiescent and an actuated positions, said second element being operatively coupled with said circuit breaker such as to enable closure thereof while in its quiescent position and to both precipitate tripping of said breaker open and to preclude breaker reclosure while in its actuated position, said first element engageably shifting said second element from its quiescent to its actuated position while said circuit breaker is intermediate said engaged and disengaged positions.

* * * * *